United States Patent [19]

Hug et al.

[11] Patent Number: 4,817,070

[45] Date of Patent: Mar. 28, 1989

[54] INFORMATION HANDLING SYSTEM FOR USE WITH INFORMATION CONTAINING STORAGE DISCS

[75] Inventors: Paul M. Hug, Saratoga; Dale C. Frese, San Jose; Paul A. Yesnosky, Sunnyvale; William H. Umeda, San Jose; Frank R. Suchomel, Morgan Hill, all of Calif.

[73] Assignee: Cygnet Systems, Inc., Sunnyvale, Calif.

[21] Appl. No.: 13,690

[22] Filed: Feb. 12, 1987

[51] Int. Cl.⁴ .................. G11B 17/26; G11B 17/22
[52] U.S. Cl. .................................................. 369/36
[58] Field of Search ......................... 369/36, 38, 39

[56] References Cited

U.S. PATENT DOCUMENTS 4,675,856  6/1987  Rudy et al. ...................... 369/36

FOREIGN PATENT DOCUMENTS 8505722  12/1985  PCT Int'l Appl. .................. 369/36

OTHER PUBLICATIONS

"Megadoc, A Modular System for Electronic Document Handling", J. de Vos, Phillips Technical Review vol. 39, 1980, No. 12.

Primary Examiner—Steven L. Stephan
Attorney, Agent, or Firm—Flehr, Hohbach, Test, Albritton & Herbert

[57] ABSTRACT

An information handling system for use with information containing storage discs, specifically optical discs, is disclosed herein. This system, which may be referred to as a jukebox, includes a combination drive and disc storage unit, a separate disc storage unit without a drive, and a storage disc transport unit. The combination drive and disc storage unit contains a drive assembly for writing information onto and retrieving it from the storage discs as well as shelves for individually storing specific ones of the discs. The separate disc storage unit includes only the shelves. While the storage disc transport unit contains an arrangement of robotic components for transporting specific storage discs between their storage shelves and the drive assembly pursuant to commands from an external source, specifically from a control computer forming part of the system and an outside host computer.

15 Claims, 13 Drawing Sheets

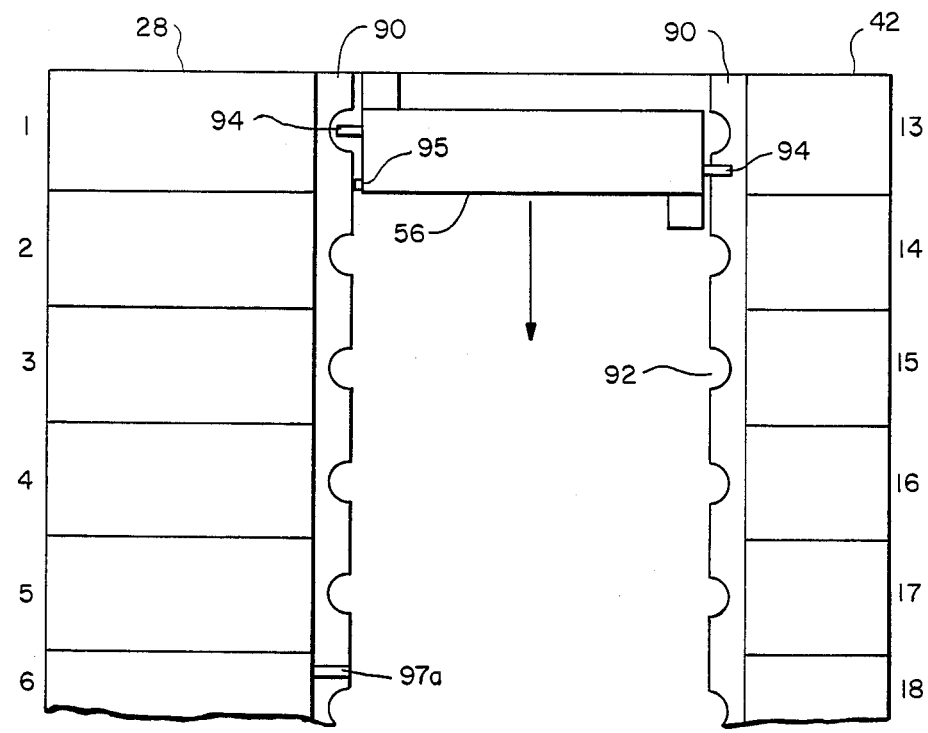
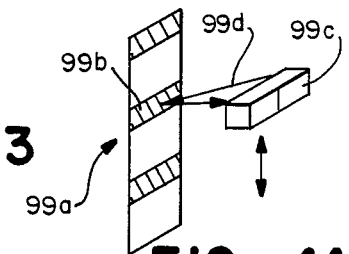
FIG.—4A
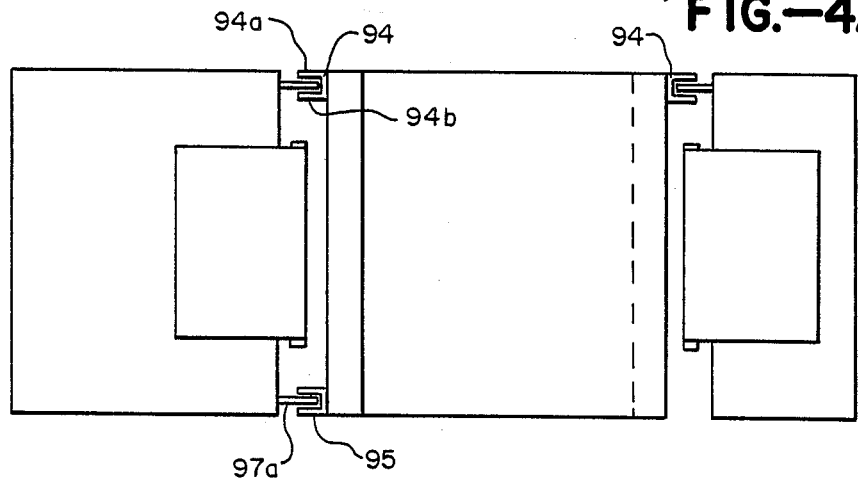
FIG.—4

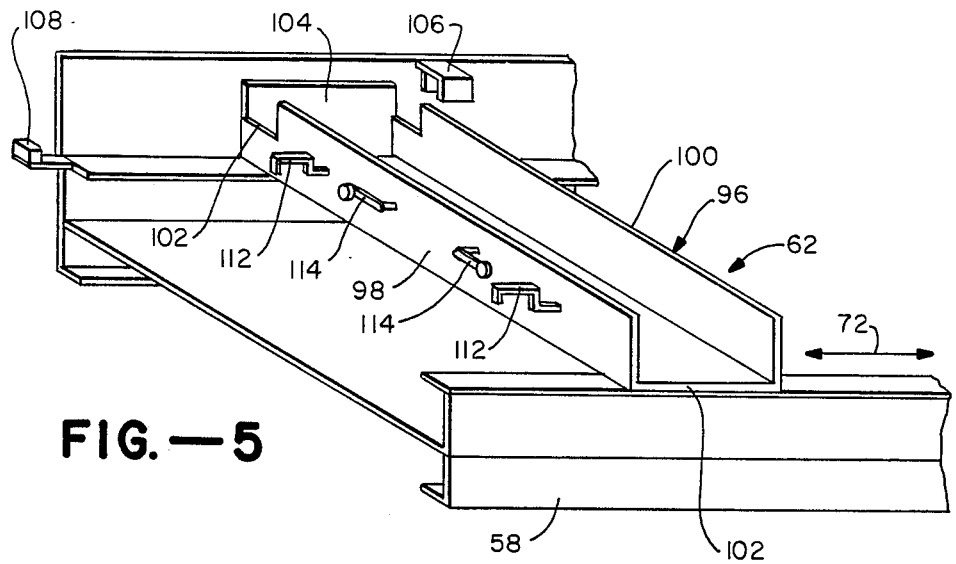
FIG.—5
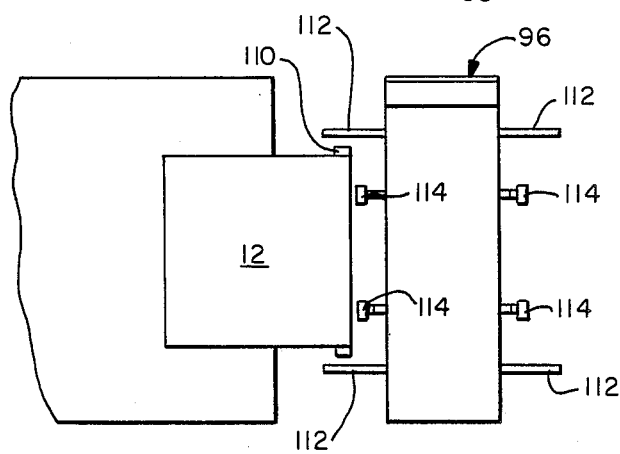
FIG.—6
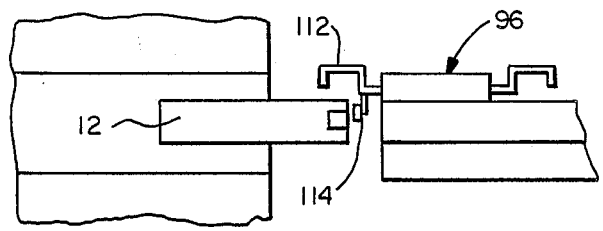
FIG.—7
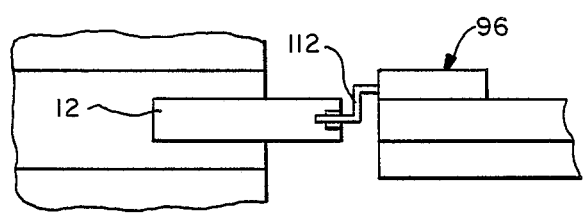
FIG.—8

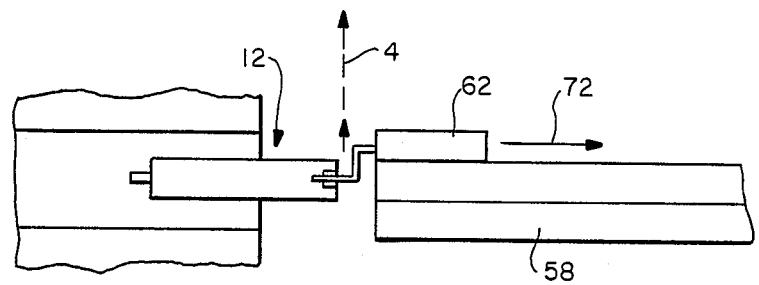
FIG.—9
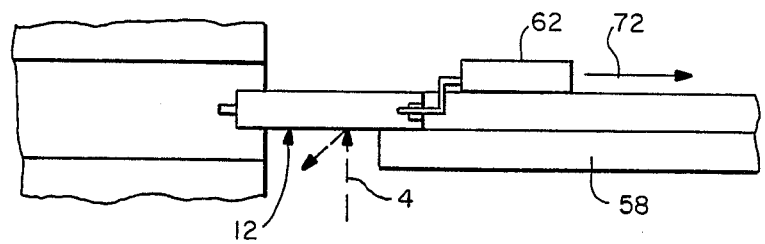
FIG.—10
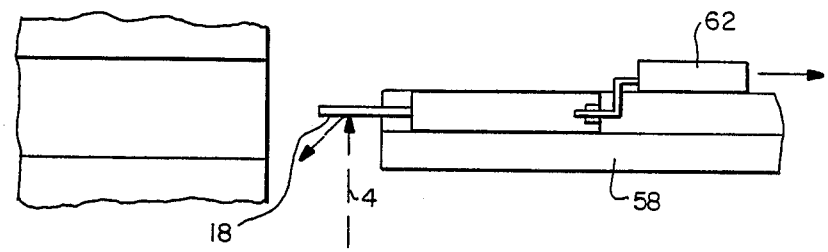
FIG.—11
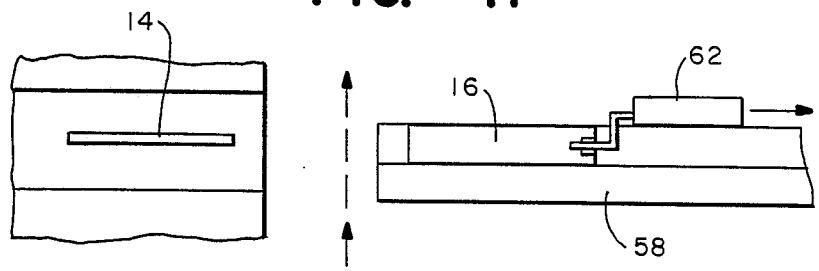
FIG.—12

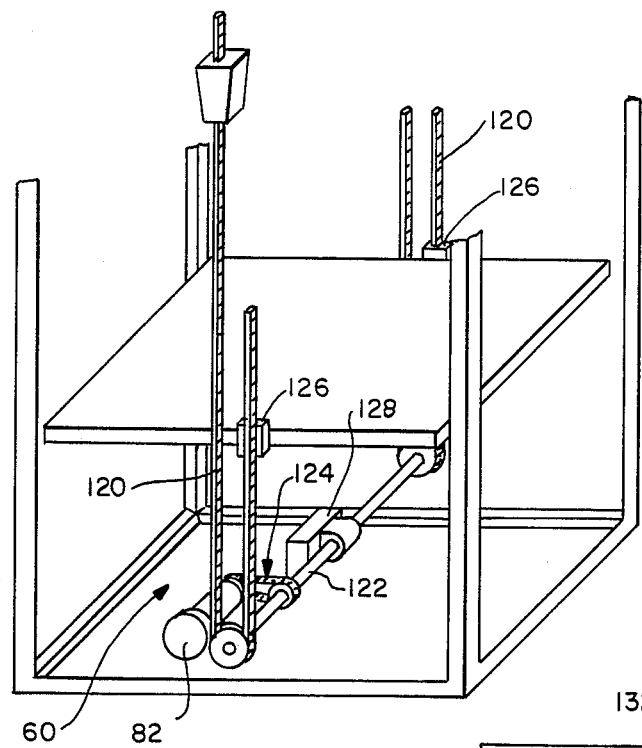
FIG.—13
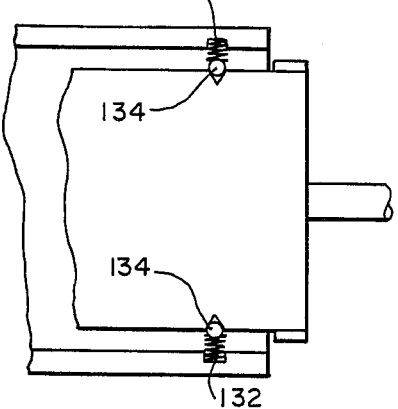
FIG.—15
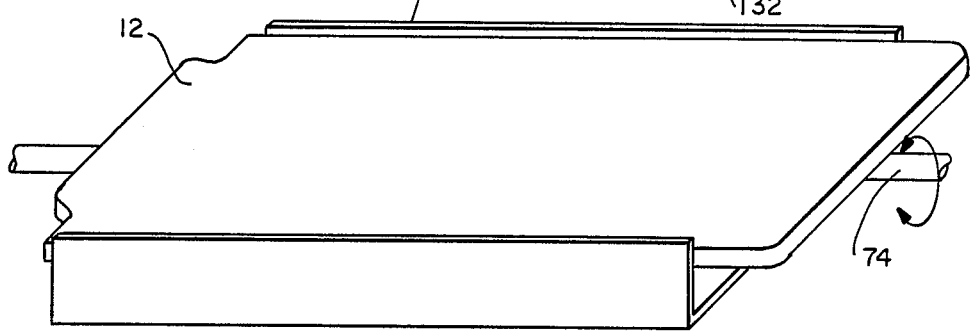
FIG.—14

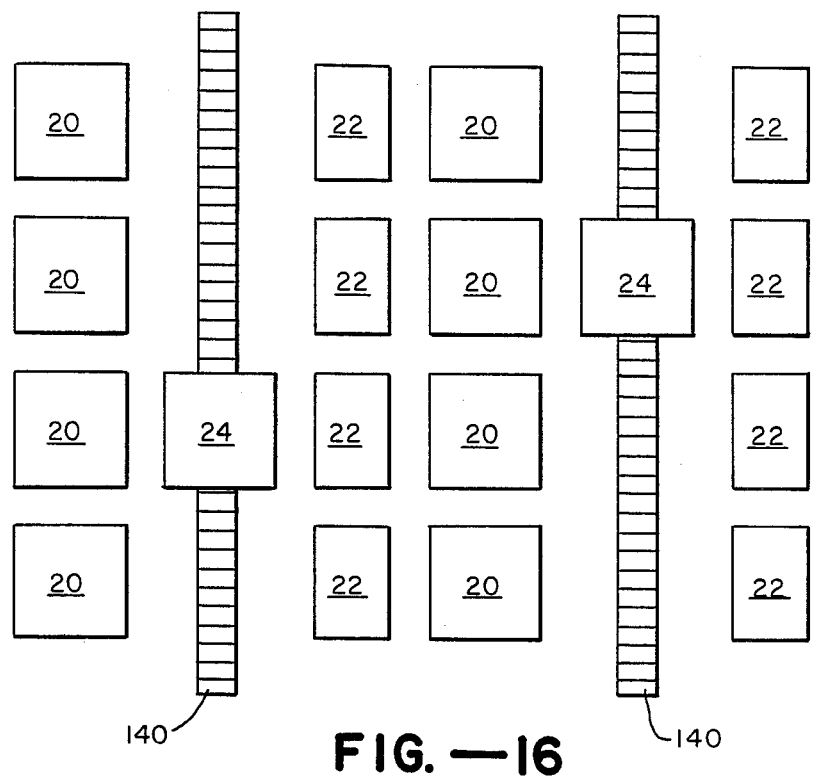
FIG.—16
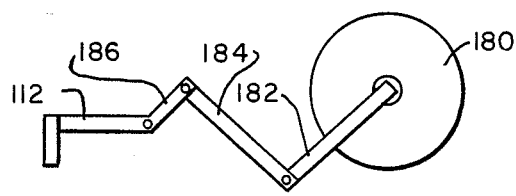
FIG.—24A
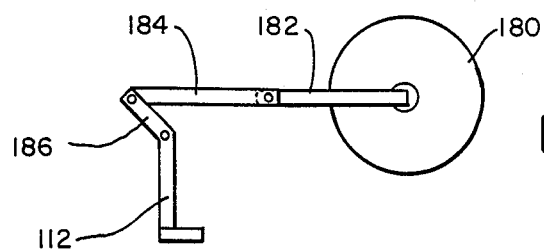
FIG.—24B

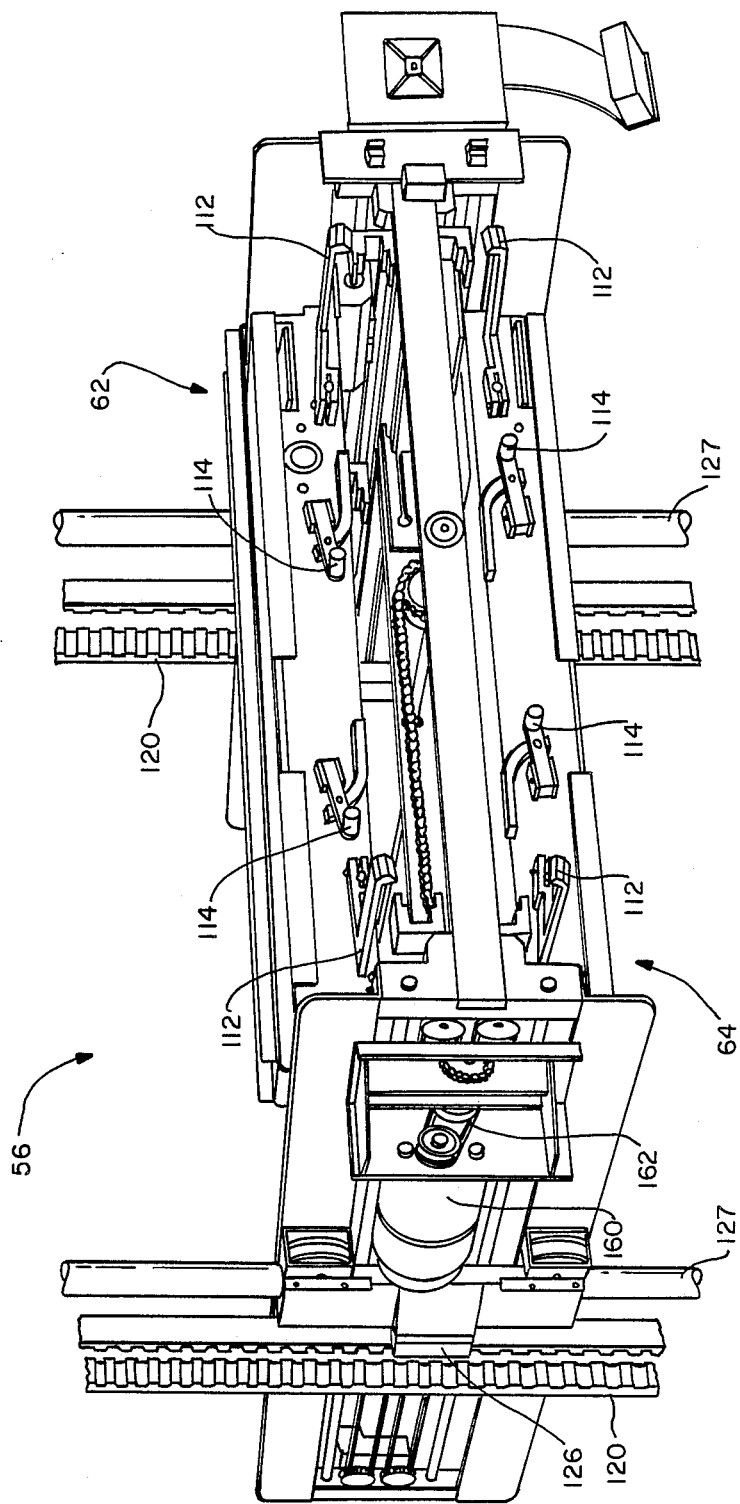
FIG.—17

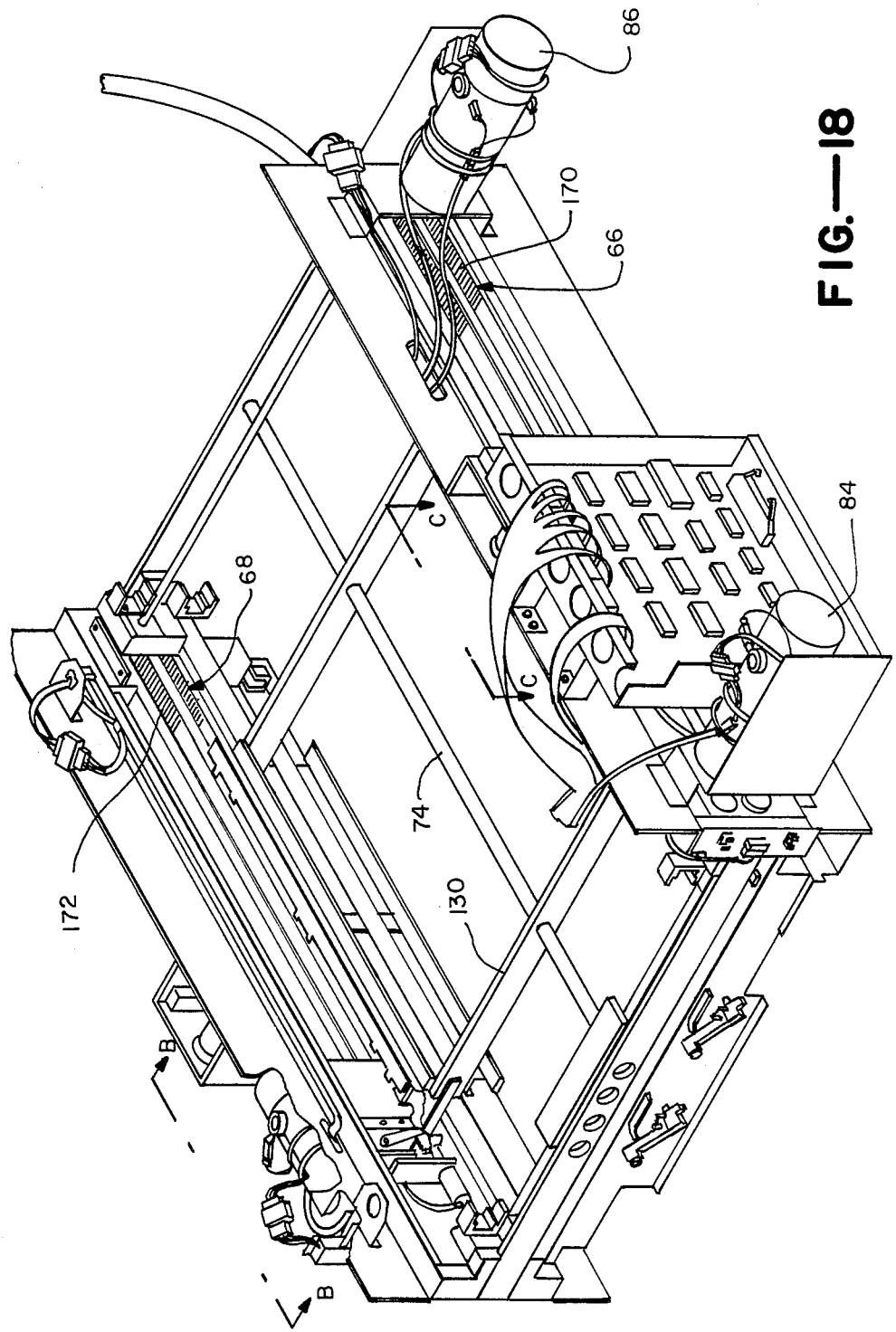
FIG.—18

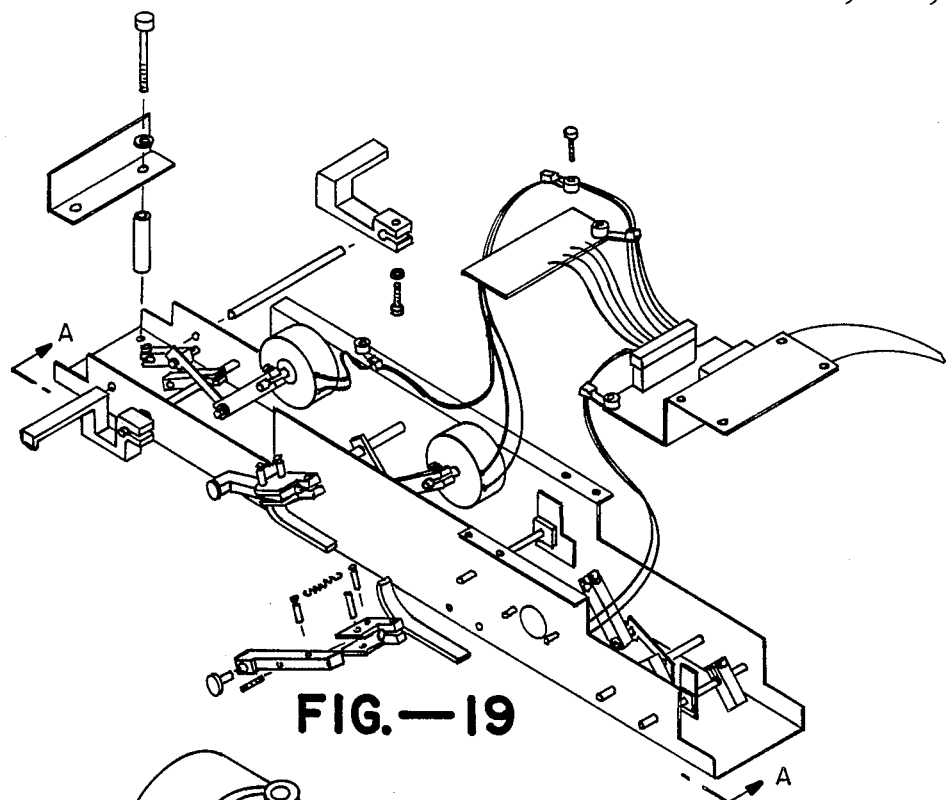
FIG.—19
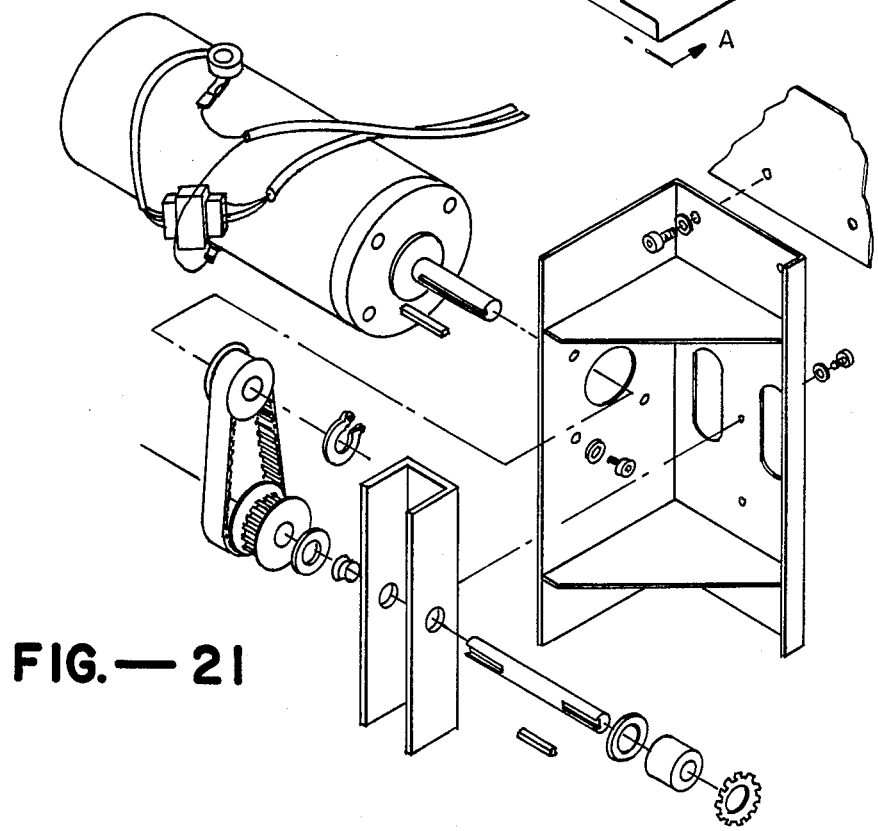
FIG.—21

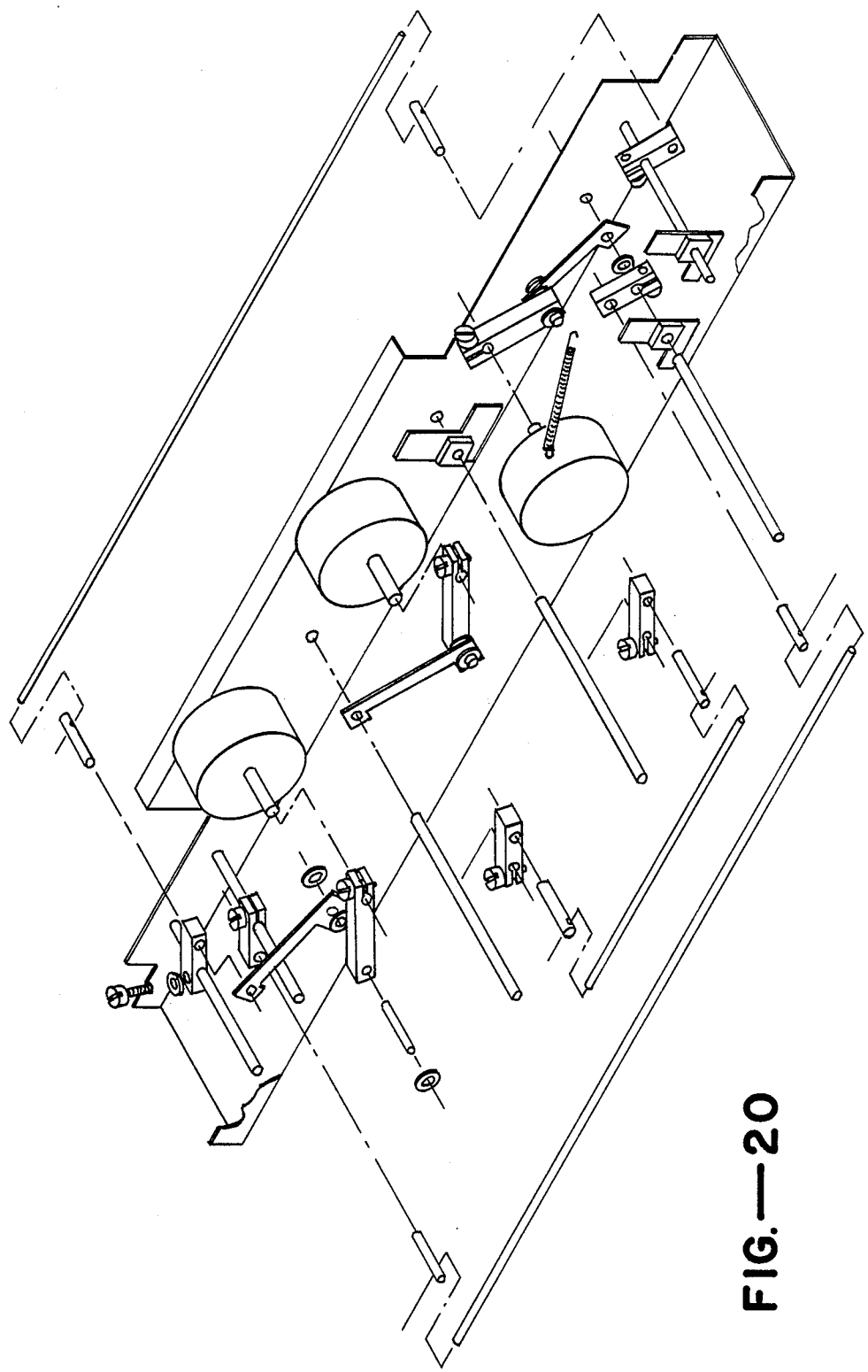
FIG.—20

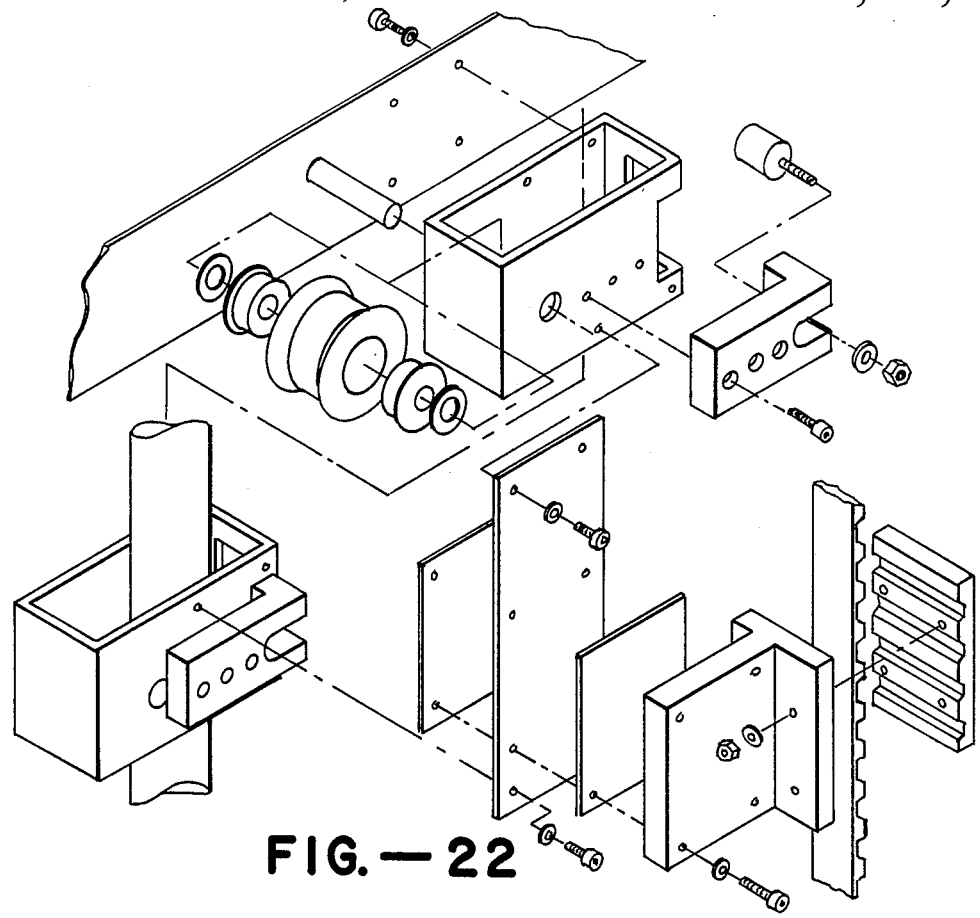
FIG.—22
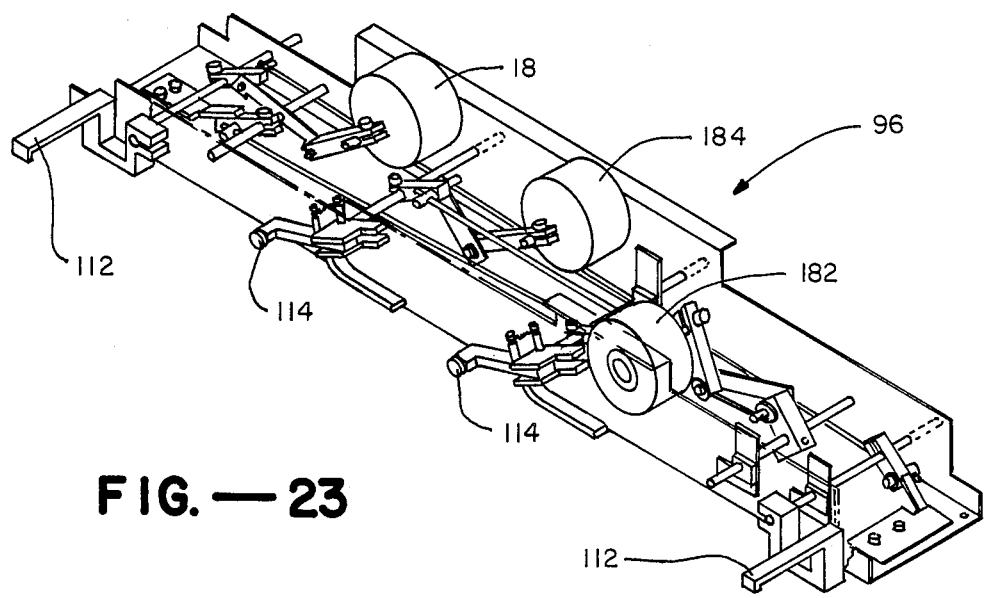
FIG.—23

INFORMATION HANDLING SYSTEM FOR USE WITH INFORMATION CONTAINING STORAGE DISCS

The present invention relates generally to information handling systems and more particular to a very specifically designed information handling system for use with information containing storage discs, for example, optical discs.

Information handling systems for optical discs, video discs or information storage discs generally are known in the art. An example of one such system is illustrated in U.S. Pat. No. 4,271,489. Another such system is described in U.S. Pat. No. 4,608,679. In each of these cases, a group of storage discs are stored on individual shelves in a storage area and transported to and from one or more read/write players (drive assemblies) in a drive area by means of a movable carriage arrangement in response to external commands. Each of these types of systems and the system disclosed herein will at times herein be referred to as a jukebox for convenience.

It is an object of the present invention to provide a jukebox, that is, an information handling system for use with information containing storage discs, which incorporates a number of improvements over the art.

One particular object of the present invention is to provide a jukebox which is readily expandable by the user in an uncomplicated and economical way.

As will be described in more detail hereinafter, the information handling system or jukebox disclosed herein utilizes a combination drive and disc storage unit and a storage disc transport unit and it may or may not include a third unit for disc storage only. The combination drive and disc storage unit includes a drive/disc support structure having a specific system coupling side, at least one drive assembly for writing information onto or retrieving information from the storage disc and a group of storage shelves for individually storing specific ones of the discs. Both the discs and the drive assembly are accessible from the coupling side of the drive/disc support structure. The storage disc transport unit includes its own transport support structure having at least one coupling side removably positionable in an operating position adjacent to and facing the coupling side of the drive and disc storage unit and means for transporting specific ones of the storage discs between any of the storage shelves and the drive assembly pursuant to commands from an external source.

The overall system just described briefly above is expandable in a number of uncomplicated and economical ways. First, a unit devoted to disc storage alone can be added to the system without structurally changing either the combination drive and disc storage unit or the disc transport unit. Rather, this latter unit is already designed to include a second coupling side removably positionable in an operating position with the added unit for transporting storage discs between the drive assembly and any shelf in the system, again without structurally modifying any of the units and particularly without structurally modifying the transport unit. Another way to readily expand the system, especially if a separate storage unit is added, is to add one or more drive assemblies to the combination drive and disc storage unit in place of shelves. The system is designed so that this can be done without structurally changing the disc transport unit. Still another way to expand the overall system economically is to add one or more drive and disc storage units with or without additional driveless disc storage units without adding an additional transport unit. The latter can be readily mounted for movement between different ones of the other units and operably coupled thereto without having to be physically connected to these units.

A second particular object of the present invention is to provide a jukebox in which individual information storage discs can be easily placed into and removed from the system without requiring deviations in the way in which its transport unit functions.

As will be described in detail hereinafter, this last-mentioned object is accomplished by providing an entry/exit arrangement in the combination drive and disc storage unit which to the transport unit appears merely as another storage shelf from a mechanical movement standpoint. To this end, the entry/exit arrangement includes its own entry/exit storage shelf supported by the drive/disc support structure so that it is accessible from both the coupling side of that structure and a different external side. Most important, the entry/exit shelf is configured and positioned so that it appears merely as another storage shelf to the transport unit and is located between two storage shelves or a storage shelf and drive assembly or two drive assemblies. Once a storage disc to be placed into the system is inserted into the entry/exit shelf from its outer accessible side, the transport unit may retrieve it mechanically in exactly the same manner it retrieves a storage unit from another shelf, although it does so at a slow speed to protect internal components within the entry/exit shelf.

Another feature of the entry/exit arrangement just described resides in its ability to prevent storage discs from inadvertently being placed in the system in the wrong way. Specifically, the arrangement disclosed herein includes mechanical means configured to cooperate with the design of the storage disc so that an individual storage disc can be placed into the entry/exit shelf from its external side in only one way, the right way.

A third particular object of the present invention is to provide an uncomplicated and yet reliable storage disc transport unit and specifically one which takes care not to damage the storage discs being transported from point to point.

As will be described in detail hereinafter, the specific transport unit disclosed herein and the other units utilize vertically extending structures. The transport unit utilizes a carriage assembly including a carriage and means for moving the carriage vertically within its own vertically extending transport support structure, means for moving the carriage vertically within the transport support structure, and at least one disc engaging and disengaging arm arrangement carried by the carriage and means also carried by the carriage for moving the arm arrangement horizontally across the carriage for transporting discs between the carriage and a storage shelf or drive assembly.

In accordance with one feature of the transport unit, the carriage itself is moved vertically by means of vertically extending drive belts supporting opposite sides of the carriage. In this way, the carriage can more reliably be maintained in a desired horizontal plane than can be achieved by the typical drive screw means utilized heretofore. This particular drive belt arrangement also includes the added feature of ensuring that the carriage does not move vertically as its arm arrangement is taking a storage disc out of or moving into a storage shelf or drive assembly. Specifically, as this latter operation takes place, a mechanical brake prevents vertical movement and preferably at the same time the drive means used to provide vertical movement of the carriage is de-energized and/or de-coupled from the carriage.

As the arm arrangement just recited is in the process of moving a particular storage disc out of or into a shelf or drive assembly, if it does so in an improper way, as will be described, the overall system is alerted and automatically goes into a safety mode. As will be seen, in some cases, attempts are made to correct the situation. However, as these attempts are made, those drive motors involved are operated in a torque mode rather than the normal acceleration mode.

A fourth object of the present invention is to provide an uncomplicated but reliable way in which the arm arrangement forming part of the carriage assembly engages a storage disc for movement between the carriage and either a storage shelf or the drive assembly. As will be seen hereinafter, each of the storage discs, actually its cartridge housing, includes a front edge and a pair of cartridge housing features consisting of laterally outward protrusions or indentations. The arm arrangement includes a pair of disc engaging hooks, means for moving the hooks around the back of the protrusions or into the indentations (hereinafter merely referred to as protrusion) and bumper mechanisms for engaging the front face of the cartridge housing. In that way, the storage disc and its cartridge housing cannot move to any significant degree relative to the arm arrangement.

With particular regard to the hooks just recited, in a preferred embodiment, each is designed to include a plurality of links pivotally connected to one another and movable between a storage disc engaging position and a disengaged position by means of a suitable drive mechanism, for example, an electrically actuated solenoid. Each hook is configured so that two of its links form a knee lock when the hook is moved into its disc engaging position and breaks out of this knee lock when the hook is moved back to its disengaging position. In that way, because of its knee lock, the hook maintains a strong hold on the storage disc without requiring the application of a large force by its associated solenoid or other such drive mechanism.

The foregoing objects and features of the present invention will become apparent hereinafter from the following detailed description in conjunction with the drawings wherein:

FIG. 1A diagrammatically illustrates by means of a block diagram an information handling system for with information containing storage discs, which system is designed in accordance with the present invention;

FIG. 1B diagrammatically illustrates in perspective view the three primary units making up the system shown in FIG. 1A, specifically a combination drive and disc storage unit, a driveless disc storage unit (a unit without a drive assembly), and a storage disc transport unit;

Figure 2:
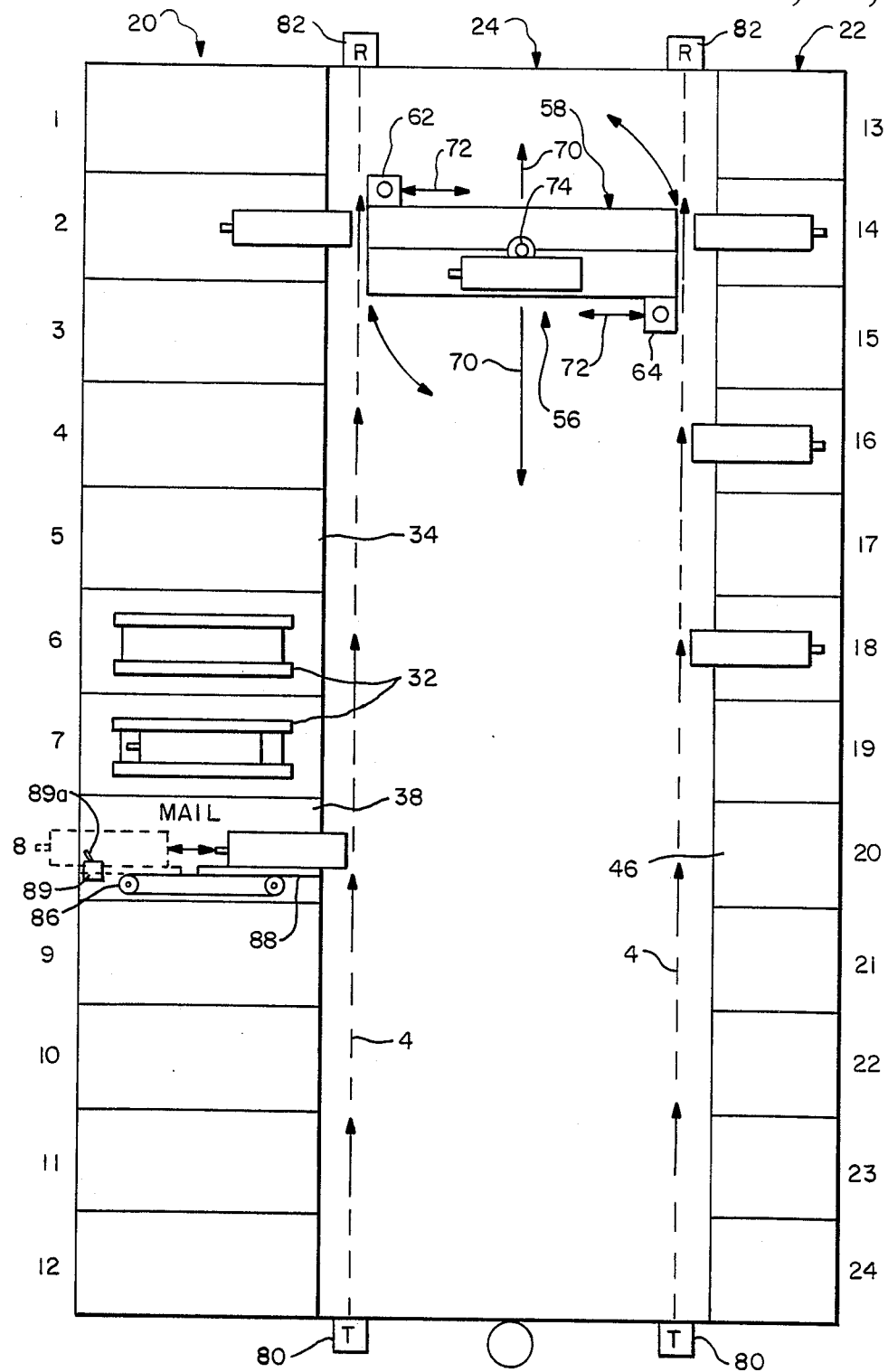

FIG. 2 diagrammatically illustrates in vertical elevation an operational feature of the system and particularly a way in which a carriage assembly forming part of the transport unit moves relative to the other two units;

FIG. 3 diagrammatically illustrates in vertical plan view the way in which the carriage assembly optically aligns itself with the drive and disc storage unit and the driveless disc storage unit;

FIG. 4 diagrammatically illustrates the same feature as FIG. 3 but in plan view;

FIG. 4A diagrammatically illustrates a modified version of the feature showing in FIGS. 3 and 4;

FIGS. 5-8 diagrammatically illustrate in perspective, plan and side elevational views how the carriage assembly engages and disengages a storage disc;

FIGS. 9-12 diagrammatically illustrate in side views the way in which the system can detect whether a storage disc is being removed properly from a storage shelf by the carriage assembly;

FIG. 13 diagrammatically illustrates in perspective view the lower end of the transport unit, particularly illustrating the way in which the carriage assembly is hooked vertically within its vertically extending support structure;

FIG. 14 is a diagrammatic illustration, in perspective view, of the way in which a section of the carriage assembly is rotated in order to rotate a storage disc carried thereby;

FIG. 15 is a diagrammatic illustration, in plan view, of the carriage assembly and storage disc shown FIG. 14, specifically depicting one way in which the storage disc is held to a section of the carriage assembly as it is rotated;

FIG. 16 is a diagrammatic illustration, in plan view, of the group of different units making up an expanded information handling system;

FIG. 17 is a perspective view illustrating certain features of an actual carriage assembly designed in accordance with the present invention;

FIG. 18 is a different perspective view of part of the carriage assembly with certain components left out for purposes of clarity;

FIG. 19 is still another perspective view of a different part of the carriage assembly of the present invention, partially broken away and partially exploded, to illustrate various components thereof;

FIGS. 20, 21 and 22 are perspective views of certain parts of the assembly of FIG. 19, taken generally along sections A—A, B—B and C—C, respectively, in FIG. 19;

FIG. 23 is a perspective view illustrating still another feature of the carriage assembly; and FIGS. 24A and 24B diagrammatically illustrate still a further feature of the carriage assembly.

Figure 1A:
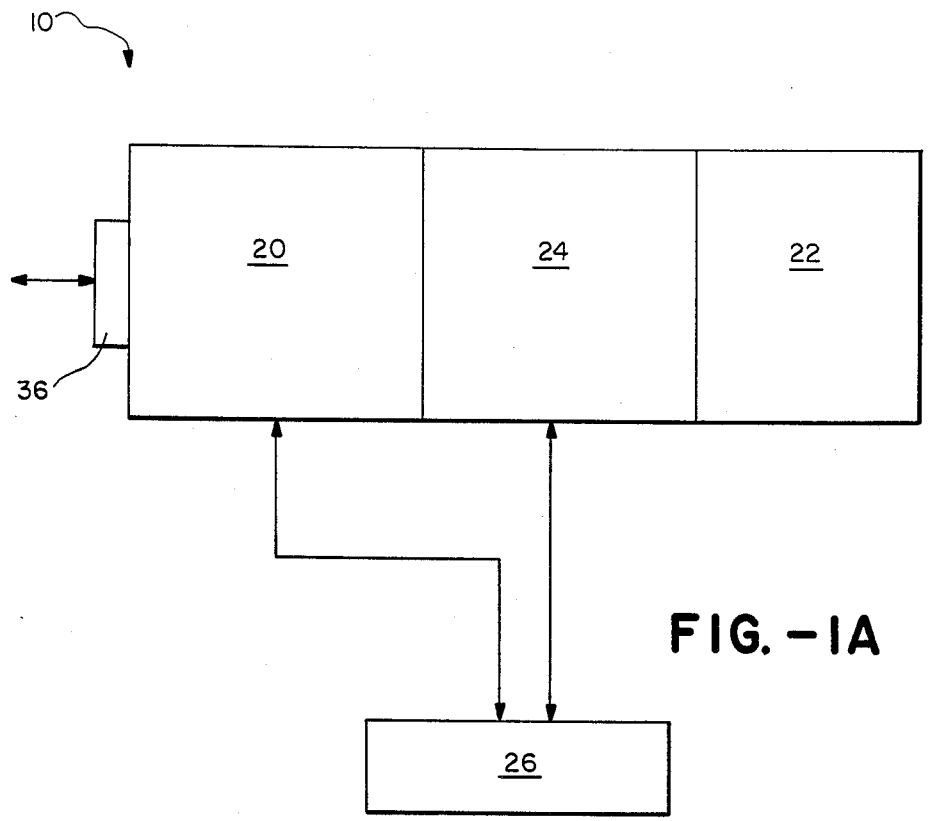
FIG. 1C is a perspective view of one embodiment of an information containing storage disc, specifically an optical disc, contained within its own cartridge housing.
FIG. 1D is a perspective view showing part of a second embodiment of a disc and cartridge housing.
Figure 1C:
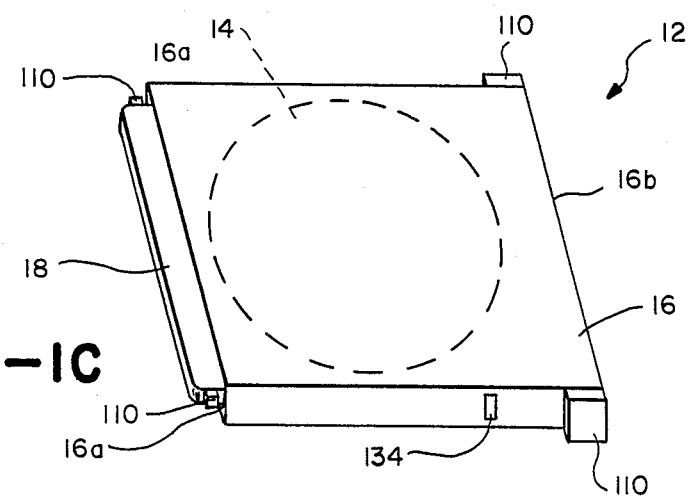
Figure 1D:
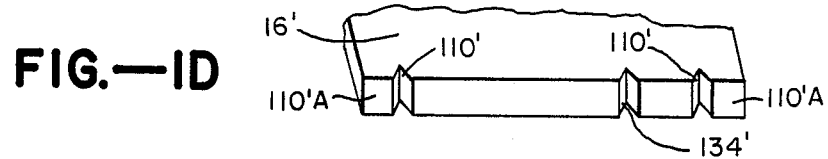
Figure 1B:
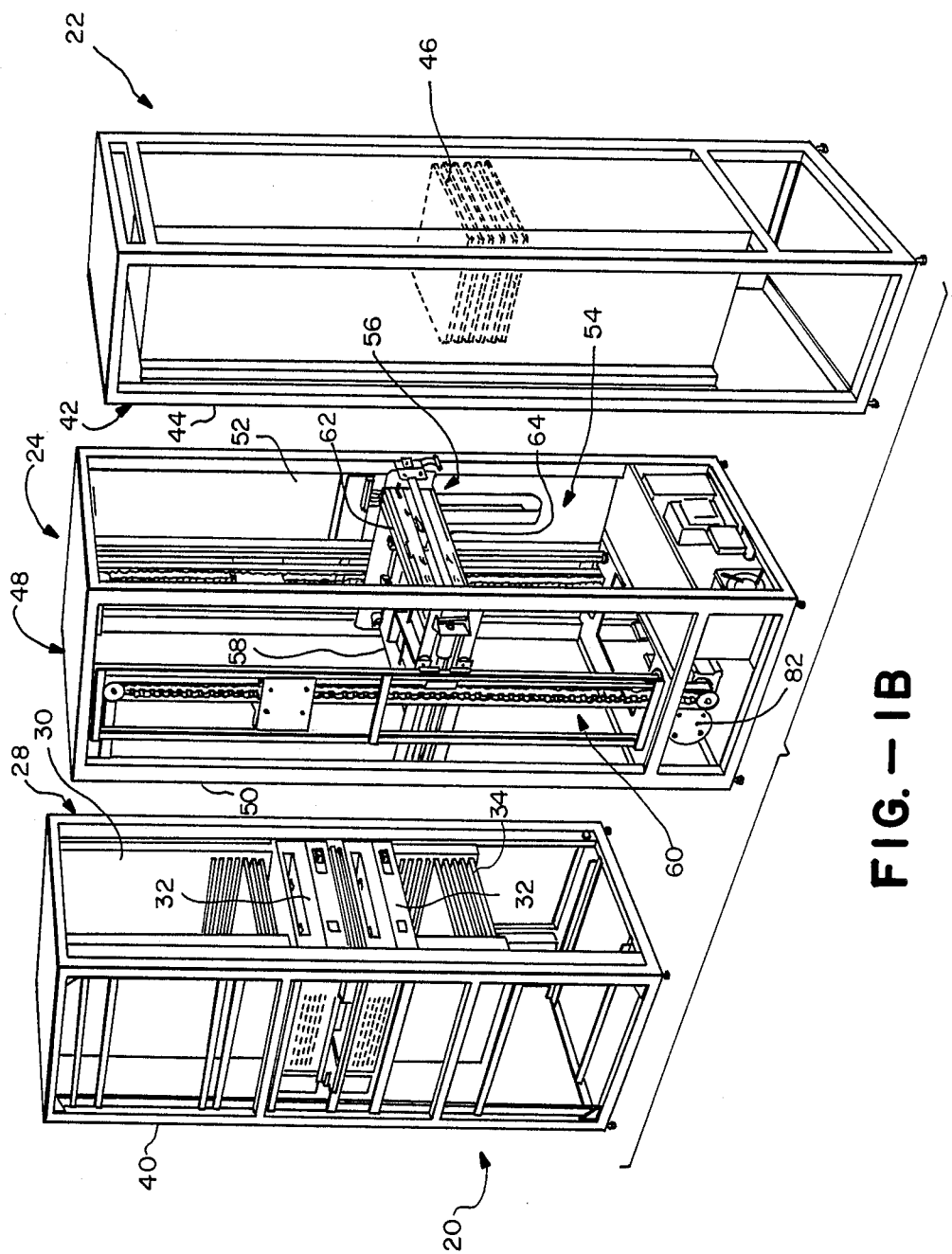

Turning now to the drawings, wherein like components are designated by like reference numerals throughout the various figures, attention is first directed to FIGS. 1A, 1B and 1C. FIG. 1A illustrates by means of block diagram an expandable type of information handling system which is designed in accordance with the present invention for use with information containing storage discs, one of which is shown in FIG. 1C within its own cartridge housing. The system is generally indicated by the reference numeral 10 and the overall disc assembly, that is, the disc and its cartridge housing, is generally indicated at 12. The disc itself is shown by dotted lines at 14 and the cartridge housing is shown at 16. The disc itself is connected to a frame having an end tab 18 which extends out of the housing so that the disc can be moved into and out of its housing.

The disc itself may be any suitable type containing information that can be read onto or retrieved from it by a cooperating player or drive assembly. Neither the disc itself nor the drive assembly per se forms part of the present invention. Both are readily providable components in the art and hence will not be described herein. In an actual working embodiment of the present invention, the disc itself can be and preferably is an optical disc which contains digital data and the drive assembly may be for example an optical disc read station. However, even this actual working embodiment can be used with other types of storage media such as, for example, tapes.

For purposes of the description to follow, it will be assumed that the entire disc assembly (the disc and its housing) is transported back and forth between its storage point and the player (drive assembly) and that the player, upon receipt of the assembly, automatically gains access to the disc itself either by removing it from its cartridge housing or otherwise. However, unless pertinent to the description to follow, reference will be made only to the disc assembly rather than the disc alone or the cartridge housing by itself.

Turning to FIG. 1A in conjunction with FIG. 1B, the overall system 10 is shown including a combination drive and disc storage unit 20, a disc storage unit without a drive, that is, a driveless disc storage unit 22, and a storage disc transport unit 24. All three are linked in a readily providable, conventional way to control computer 26. The control computer itself does not per se form part of the present invention and can be readily provided along with operating software by those with ordinary skill in the computer and computer software design art in view of the teachings herein. In other words, computer 26 and its operating software can be readily provided to operate overall system 10 in the manner to be described utilizing the structural components of the system which will also be described in view of the detailed description to follow. Moreover, it is important to note that control computer 26 is designed to command transport unit 24 so as to transport disc assemblies between various locations in the system to be described below. However, the particular disc assembly or assemblies to be transported and where they are transported is determined by a host computer (not shown) which interfaces with computer 26 and which gives these commands to that computer.

Referring specifically to FIG. 1B, the drive and disc storage unit 20 is shown including the following components broadly. First it includes a vertically extending drive/disc support structure 28 having a plurality of vertically extending sides including a specific system coupling side 30. One or more drive assemblies 32 are supported by structure 28 and each has means (not shown) for writing information onto or retrieving information from a particular storage disc 14 (FIG. 1C) pursuant to commands from the host computer referred to above when the particular disc is in an operating position defined by the drive assembly. As indicated above, these drive assemblies are known in the art and hence will not be further described herein. It suffices to say that each is supported by drive/disc support structure 28 at a particular point along its vertical extent such that the operating position of the assembly is accessible from the coupling side 30 of the support structure.

In addition to the general components thus far described, the drive and disc storage unit 20 includes a plurality of readily removable storage shelves 34 for individually storing specific ones of the storage disc assemblies and an entry/exit arrangement generally indicated at 36 in FIG. 1A for placing a specific storage disc into and removing it from overall system 10. The storage shelves are supported by the drive/disc support structure in vertically spaced positions above and/or below drive assemblies 32 so as to be accessible from the coupling side 30 of structure 28. As stated above, they are readily removable and thereby groups thereof can be easily replaced with a larger shelf for containing an additional drive assembly. At the same time, as will be best described in conjunction with FIG. 2 hereinafter, entry/exit arrangement 36 includes its own entry/exit storage shelf 38 (see FIG. 2) which is accessible both from coupling side 30 of structure 28 and from an opposite external side 40.

Still referring to FIG. 1B, the driveless disc storage unit 22 also includes a vertically extending support structure 42 having its own vertically extending sides including a specific coupling side 44. A plurality of storage shelves 46 for containing individually specific disc assemblies 12 also form part of unit 22 in vertically spaced positions so as to be accessible from coupling side 44. Note that unit 22 does not include a drive assembly 32 and, as will be seen hereinafter, it does not actually have to form part of overall system 10. Rather, it can be added to the system at a subsequent time as a means of expanding it when that becomes desirable. However, for purposes of describing the overall system, unit 22 will be included.

Referring now to the storage disc transport unit 24, this unit is shown in FIG. 1B including its own vertically extending transport support structure 48 having a number of vertically extending sides including opposite system coupling sides 50 and 52 which, as will be seen hereinafter, are removably positionable in operating positions adjacent to and facing the coupling sides 30 and 44, respectively, of units 20 and 22 without having to be mechanically connected to either one. The storage disc transport unit also includes an overall apparatus which is generally indicated at 54 in FIG. 1B for transporting specific ones of the disc assemblies 12 between any of the storage shelves 34 and 46, the entry/exit shelf 38 and drive assemblies 32 pursuant to commands from computer 26 which, in turn, receives its instructions from the host computer, as stated previously. As will be described in detail hereinafter, apparatus 54 includes a carriage assembly 56 including a carriage 58, a drive arrangement generally indicated at 60 in FIG. 1B for moving the carriage vertically within transport support structure 48, two disc engaging and disengaging arm arrangements 62 and 64 carried by carriage 58, and drive mechanisms 66 and 68 (see FIG. 18) for moving the arm arrangements horizontally across the carriage.

Referring specifically to FIG. 2, overall system 10 is shown diagrammatically in an operating position, that is, with the coupling sides 50 and 52 of transport unit 24 in their respective operating positions adjacent to and facing the coupling sides 30 and 44 of units 20 and 22, respectively. Note that the storage shelves 34 and 46 have been exaggerated in size (with some obviously not shown) and that all of the shelves including those containing drive assemblies 32 have been given position numbers 1-24 for purposes of description. In the diagrammatic depiction of FIG. 2, some of the storage shelves include disc assemblies 12, specifically shelves 2, 14, 16 and 18, as does the entry/exit shelf 38 which is in position 8. In this regard, for reasons which will become apparent hereinafter, when a given disc assembly 12 is properly stored in or on its particular shelf, a front end segment thereof extends out beyond the coupling side of its unit, coupling side 30 in the case of unit 20 and coupling side 44 in the case of unit 22.

Still referring to FIG. 2, carriage assembly 56 is also depicted quite diagrammatically and, as shown in this figure, includes only the carriage 56 and arm arrangements 62 and 64 for purposes of the present discussion. The entire carriage assembly and arm arrangements are moved as a single entity by drive arrangement 60 to be described hereinafter, as indicated by vertical arrows 70. Note that as it does so, opposite edges of the carriage move past the front spaces of shelves 34, 46, entry/exit shelf 38 and drive assemblies 32. At the same time, each of the arm arrangements 62 and 64 is movable horizontally from one end of the carriage to the other end by means of drive mechanisms 66 and 68 to be described hereinafter in conjunction with FIG. 18, as indicated by two-way arrows 72. Moreover, as will also be described in more detail hereinafter in conjunction with FIGS. 14, 15 and 18, a section of carriage 58 is capable of rotating 180° back and forth about a center shaft 74 (without rotating arm arrangements 64), by means of a drive arrangement (see FIGS. 18-22) to be described hereinafter.

With overall system 10 described thus far, attention is now directed to the way in which it operates without regard to the details of its structural components. Still referring to FIG. 2, system 10 is initially placed into operation first by ensuring that the three units 20, 22 and 24 are at their proper operating positions with respect to one another. In this regard, as will be seen hereinafter in conjunction with the description of FIGS. 3 and 4, the three units do not have to be physically connected or even touching one another. The carriage assembly 56 and units 20 and 22 include cooperating optical sensing arrangements which ensure the units are in the proper operating positions and also tells the computer exactly where each shelf position is with respect to the carriage assembly at any point along its vertical path of movement and whether the shelf is a storage shelf, an entry/exit shelf or at drive assembly location. Therefore, the carriage assembly is initially caused to move through its entire vertical extent from, for example, its top end to its bottom end. As it does so, it senses the various positions of shelves 1-24 to determine first if they are in acceptable locations (that is, operatively coupled properly) which is determined by the fact that the optical sensing arrangements function properly at all and exactly where and what each is on the vertical path. This information is delivered to computer 26 through a flexible lead bus 80 illustrated in FIG. 1B. In this regard, the drive arrangement 60 for moving carriage assembly 56 vertically includes an electric drive motor 82 (see FIGS. 1B and 13) having an encoder incorporated therein and also a servo-feedback circuitry responsive to the acceleration/deceleration curve associated with the carriage as it moves between its extreme upper end and its extreme lower end. In that way, as the carriage moves vertically, the computer through the encoder can keep track of where the carriage is comparing actual position to that calculated by the computer based on the acceleration/deceleration curve associated with the carriage. If there is too large of a discrepancy between actual and calculated position, the computer includes software to cause the carriage assembly to recalibrate its position along its vertical extent. To this end, the carriage also senses when it has reached the extreme top end of its movement and its extreme bottom end by sensing when the carriage and therefore the encoder have stopped at either end.

In addition to assuring that the three units 20, 22 and 24 are operatively positioned correctly and calibrating the vertical extent of the carriage assembly, the horizontal movement of each arm arrangement must be calibrated and input into computer 26. This is accomplished in part by means of optical sensors and by means of mechanical stops as will be described hereinafter in conjunction with FIG. 5. For the moment, it suffices to say that each actuator arm is first moved horizontally to one end of carriage 58 and then to the opposite end. At each end of the carriage, it senses the point at which it is physically caused to stop (its end edge) then moves back a small distance to a photosensing point (its alignment point).

The drive mechanisms 66 and 68 for arm arrangement at 62 and 64 include their own drive motors 84 and 86, respectively (see FIG. 18), which like motor 82 have their own encoder and similar servo-feedback circuits. The computer 26 monitors where each arm arrangement is via the associated encoder of each motor 84 and 86 while comparing actual position to that calculated based on the acceleration/deceleration curve associated with the arm arrangement. Thus, when, for example, arm arrangement 62 reaches its far left end stop on carriage 58 (as viewed in FIG. 2), this is fed into the computer by the encoder as, for example, counter point 0000. When the arm arrangement moves back a small distance to its alignment point, the amount of distance (in counts) is fed into the computer by means of the encoder, telling the computer exactly where the left end alignment point is. This is repeated for the right end of the carriage and for both ends with respect to arm arrangement 64.

During subsequent operation of the overall system, the computer through the encoder of each motor 84 and 86 determines where its specific arm arrangement is while comparing that actual position to that calculated based on the acceleration/deceleration curve associated with the arm arrangement. In order to ensure that there is not a significant disparity between these two positions, that is, where the computer thinks the arm arrangements are, (which is the calculated position), and where they actually are, (which is the encoder position), each time an arm arrangement has reason to be in a position near one end of the carriage it automatically realigns itself at its alignment point. In this regard, these alignment points are specifically designed into the overall system so as to be located at or near points where the arm arrangements always must go, specifically, to points where they actually pick up or drop off disc assemblies.

The reason it is critical that the computer know exactly where the carriage is at any point along its vertical extent and that it know where each arm arrangement is during its horizontal movement is that the computer operates the arm arrangements in a manner to be described hereinafter such that each is able to transport particular disc assemblies between storage shelves 34 and 46, entry/exit shelf 38 and drive assemblies 32. To this end, when, for example, computer 26 commands the carriage assembly to transport disc 12 from shelf position 2 and deliver it to the drive assembly in position 6, the carriage assembly moves to position 2 as shown in FIG. 2 and, for example, the actuator arm 62 moves through a series of end positions to be described hereinafter in conjunction with FIGS. 6-8 for engaging the disc assembly in position 2. One of these end positions corresponds to an alignment position, at which time the arm arrangement can recalibrate itself. At the same time, it includes an arrangement of hooks and bumpers to be described in conjunction with FIG. 5 for engaging the front face of cartridge assembly in shelf position 2.

Thereafter, arm arrangement 62 moves back away from that shelf 2 so as to pull the disc assembly onto carriage 58. In this regard, it can be seen from FIG. 2 that the carriage assembly is capable of supporting two such cartridge assemblies, one movable by arrangement 62 and the other movable by arrangement 64. Once the disc assembly 62 is properly supported on carriage 58, either that disc assembly or the other one on the carriage can be transported to another shelf or to a drive assembly by moving the carriage assembly downward or upward. At that time, the hook and bumper arrangements of the appropriate actuator can engage its associated cartridge assembly and move into the designated shelf or drive assembly.

Before a cartridge assembly is removed from the carriage 58 it may be necessary to rotate the particular disc assembly before it is either stored away or more specifically because it is to be inserted into a drive assembly with a particular side of the disc facing upward. To this end, a section 130 of the carriage (see FIGS. 14 and 18) can be rotated in a manner described briefly above and more specifically in the manner to be described in detail hereinafter. In this regard, it should be noted that the carriage assembly needs a certain amount of clearance at its top end and a certain amount of clearance at its bottom end to perform this rotation function. Computer 26 is designed to allow the carriage to rotate only if it is a predetermined distance below its top end and a predetermined distance above its bottom end.

Still referring to FIG. 2, it should be noted that as the carriage assembly 56 moves vertically through drive/disc support structure 42, an entire vertical space is present between the top end of the structure and its bottom end on either side of the carriage assembly between the latter and the front faces of the disc assemblies stored in units 20 and 22. These vertical alignment corridors are supposed to be present if the disc assemblies are properly located in units 20 and 22 and the carriage assembly is properly positioned for vertical movement which means that the arm arrangement 62 and 64 are maintained within the confines of carriage 58. Only under these conditions is it desirable to move the carriage assembly vertically. Therefore, unit 24 includes mechanisms to detect across the vertical extent of each corridor. Specifically, as shown in FIG. 2, phototransmitters 80 are mounted to the bottom end of support structure 42 at the appropriate locations and cooperating receivers (detectors) 82 are located at the top end of the structure in direct alignment with transmitters 80. This arrangement produces a pair of light beams 84 on either side of the carriage assembly. Should either of these light beams be interrupted by an obstacle in its path, for example, an incorrectly positioned disc assembly or should arm arrangement 62 or 64 be inadvertently located beyond its carriage 58, this information will be given to computer 26 which will prevent the carriage assembly from moving vertically. As will be seen hereinafter in conjunction with FIGS. 9-12, this detection arrangement is also used to determine whether a disc assembly is properly removed from or stored into shelves 34, 38 and 46 and players 32.

Speaking of shelves, as indicated previously, drive/disc support structure 28 includes an entry/exit shelf 38 which is accessible from both the coupling side of the structure and an opposite external side. As shown in FIG. 2, the entry/exit slot includes a mechanism, for example the motor and belt arrangement generally indicated at 86 within shelf 38 for moving a tray 88 between a pickup position accessible from side 40 of support structure 28, as illustrated in dotted lines, and a storage position accessible from coupling side 30, as indicated by solid lines. This tray carries a disc assembly which is inserted into the system through the external side of unit 20 and moves the disc assembly to its internal storage position illustrated in FIG. 2. With the disc assembly in this latter position, it is so positioned to appear like any other disc assembly stored on a storage shelf 34 or 46. In other words, the carriage assembly 56 will pick up the disc assembly from and deliver it to entry/exit shelf 38 in the same mechanical way as it does so with regard to any other shelf. In this way, placing a disc assembly into or removing it from system 10 does not interrupt or change the normal mechanical operation of carriage assembly 56. However, as will be seen below in connection with FIGS. 3 and 4, a disc assembly may be picked up from and delivered to the entry/exit shelf or the drive assemblies at different rates of speed, for example slower speeds, than it is picked up and delivered to a storage shelf. This, for example, helps ensure that the disc assembly does not inadvertently damage any components within the entry/exit shelf or a drive assembly.

Still referring to entry/exit shelf 38, as indicated previously this shelf is configured to allow a disc assembly to be placed therein in the right way only. To this end, an actuating arm 89 (see FIG. 2) carrying a detent 89A thereon is spring-loaded (by means not shown) within shelf 38 for movement between a biased disc blocking position and a retracted position. With the actuating arm in its biased blocking position, if a disc assembly is placed in shelf 38 incorrectly, an opened edge 16A of its housing 16 (see FIG. 16) is engaged by detent 89A to prevent the assembly from entering. If the disc assembly is inserted correctly, its closed end 16B pushes the actuating arm out of the way (to its retracted position) without engaging the detent.

Turning now to FIGS. 3 and 4, attention is directed to the specific way in which carriage assembly 56 calibrates its vertical movement and determines the location of various positions 1-24 of units 20 and 22. As illustrated in FIGS. 3 and 4, each of the support structures 28 and 42 forming part of units 20 and 22 include in plates 90 mounted on the edges of coupling sides 30 and 44. As best seen in FIG. 4, each of these vertical plates is positioned near a corner of its support structure beyond the edges of those disc assemblies in the shelves. As best seen in FIG. 3, each plate 90 includes a relief 92 which is precisely located with respect to an associated shelf or drive assembly. This is possible since each plate is physically connected to an associated support structure 28, 42. In this regard, it should be noted that whether a storage shelf in unit 20 is provided for storing a disc assembly, as for example in the case of position 2, or a drive assembly, as in the case of position 7, the disc assembly is delivered to or picked up from the same relative position with respect to relief 92. In this way, any of shelf positions can be utilized to receive a drive assembly and either of the drive assembly shelves shown can be used to support the disc assembly.

Still referring to FIGS. 3 and 4, carriage assembly 56 is shown including photosensing devices 94 mounted to opposite sides of its frame. Each device which is readily providable includes a phototransmitting side 94A and a photoreceiving side 94B with a light beam (not shown) therebetween. Each device is positioned so that the solid part of cooperating plate member 90, between reliefs 92, will break the beam of a cooperating device while the relief will not. Thus, as the carriage assembly moves through its vertical extent, plate members 90 and devices 94 cooperate to sense the precise position of the carriage assembly.

Carriage assembly 56 also carries a third photosensing device 95 which may be identical to devices 94 and unit 20 carries individual flags (plates) 97A and 97B adjacent those shelves having drive assemblies (97A) and the entry/exit shelf (97B). Device 95 cooperates with these flags in the same manner as devices 94 cooperate with plate 90 to distinguish the drive assembly and entry/exit shelves from the storage shelves. With this information, the computer 26 operates arm arrangements 62 and 64 at a slower speed when transporting a disc assembly to and from the drive assemblies and entry/exit shelf than to and from a storage shelf. Moreover, the flag 97A associated with a drive assembly can vary in height depending on the type of drive assembly used to vary the speed in different ways or otherwise make computer 26 aware of the particular device assembly being used. In this regard, the flag 97A is easily removable and easily engagable into different shelf positions for converting a storage shelf to a drive assembly shelf.

There may be a situation where unit 24 moves horizontally relative to units 20 and 22, as will be discussed hereinafter in conjunction with FIG. 16 as an example. Under these circumstances, a different type of optical sensing arrangement may be used instead of devices 94, 95 and plates 90 and flags 97A,B. FIG. 4A illustrates such an arrangement which includes a strip 99A of vertically spaced reflective surfaces 99B which would replace the plates 90 and reliefs 92. Individual reflective surfaces could replace flags 97A and 97B. A combination optical transmitter/receiver 99C would replace each device 94, 95. A beam of light 99D is directed to strip 99A and caused to reflect off of surfaces 99B as each device 99C moves with carriage assembly 56 and is reflected back to the device. The reflective strips can be positioned to correspond with the positions of reliefs 92 thus operating in the same way. The reflective strips corresponding to flags 97A, 97B can vary in height just as the flags do. The advantage to this approach is that units 20, 22 and 24 can move horizontally (from side to side) without having to move away from one another as would be the case with plates 90, flags 97 and devices 94 and 95.

Referring to FIG. 5, attention is now directed to the way in which arm arrangement 62 calibrates its horizontal movement 72 on carriage 58. Both the arm arrangement 62 and the carriage 58 have been illustrated diagrammatically in FIG. 5. For an actual working embodiment of these components, reference is made to FIGS. 17-22. Arm arrangement 62 is shown in FIG. 5 including a cross arm 96 having opposite front faces 98 and 100 and sides 102. The cross arm 96 moves on carriage 58 in the manner described previously and carries with it an end plate 104. At the same time, a photosensing device 106 corresponding to the previously described devices 94 is mounted near each end of carriage 58. One such device is shown in FIG. 5. The other such device is mounted on the other end of the carriage. Each device is mounted inward a short distance from a mechanical stop 108 which prevents cross arm 96 from moving beyond the carriage. As the cross arm moves to its stop 108 end plate 104 moves through and past device 106. As indicated above, in order to calibrate the horizontal movement of the cross arm (actually the overall arm arrangement), it first moves to its stop position and then goes back to its alignment position. As shown in FIG. 5, this alignment position is where the end plate 104 first breaks the optical beam forming part of device 106. As just stated, a similar device is located at the other end of the carriage along with a cooperating mechanical stop. Moreover, a similar pair of stops and cooperating optical sensing devices are mounted on the underside of carriage 58 for use with arm arrangement 64 which includes a corresponding cross arm and end plate.

As indicated previously, each of the arm arrangements 62 and 64 serves to engage a disc assembly for transporting it onto and off of the carriage. Turning to FIGS. 6-8 in conjunction with FIG. 1C and FIG. 5, attention is directed to the way in which this is accomplished. First, it is important to note that the cartridge housing 16 of the disc assembly 12 includes laterally outwardly extending protrusions 110 on opposite sides of the cartridge housing at its front end, as illustrated in FIG. 1C. Similar protrusions 110 are on opposite sides of end tab 18. In FIG. 1D a modified cartridge housing 16' is shown with indentations 110' so as to functionally provide corresponding protrusions 110'A. For purposes herein, only the protrusions 110 will be referred to, it being understood that they could be functionally provided by indentations such as indentations 110'.

As illustrated in FIG. 5, the front face 98 of cross arm 96 carries with it a pair of laterally spaced, horizontally aligned hook members 112 and adjacent laterally spaced, horizontally aligned bumper members 114. The bumper members are mounted for simultaneous movement between raised, non-actuated positions shown in FIG. 5 and lowered, actuating positions, best seen in FIG. 7. In a similar manner, the hook members 112 are mounted for simultaneous movement between raised non-actuating positions shown in FIGS. 5 and 7 and lowered, actuating or disc engaging positions shown in FIG. 8. While not shown in FIG. 5, an identical arrangement of bumper members and hook members are located on the opposite face 100 of cross arm 96. Moreover, as also will be described hereinafter in conjunction with FIG. 23, a single drive arrangement is provided for simultaneously moving all of the bumper members on cross arm member 96 and two drive arrangements are provided for moving the two pairs of hook members.

Referring particularly to FIGS. 6-8, attention is now directed to the way in which the cross arm 96 actually engages a cooperating disc assembly for movement onto and off of carriage 58. As a first step, the carriage itself must be moved to a vertical position in alignment with the particular disc assembly in question. In FIG. 2, the carriage assembly is positioned next to position 2. Once that is done, the arm arrangement is moved horizontally to a predetermined first position close to but spaced from the disc assembly in shelf position 2. This might be for example its alignment position determined by device 106 or another position spaced inward from stop 108. During this movement, the bumper and hook members are in their unactuated positions. The cross arm 96 is stopped in the first position at which time the bumper members are actuated, as shown in FIG. 7. The cross arm is then moved in incremental distance forward so that the bumper members engage the front face of cartridge housing 16. At that time, the hook members 112 are actuated, thereby moving downward, rotating 90°, as illustrated in FIG. 8, so that they extend around protrusions 110. In this manner, the cartridge housing is locked into engagement with the hook members and the bumpers so as now to be able to move horizontally. Once this takes place, the cross arm can be moved horizontally rearward so as to pull the disc assembly onto carriage 558. Thereafter, the hook members can be deactuated in order to release the disc assembly and the cross arm can be moved an incremental distance further so that the bumper members disengage the disc assembly and can thereby be deactuated. This places the disc assembly on carriage 58 free of arm arrangement 62.

The description immediately above was for one side of cross arm 96. The hook and bumper members on the other side can be operated in a similar manner for engaging a disc assembly on that side. Moreover, the cross arm forming part of arm arrangement 64 includes corresponding hook and bumper members. These various hook and bumper members are operated through commands from computer 26 in order to transport disc assemblies between various storage shelves, the entry/exit shelf and drive assemblies. Further, while they have been shown diagrammatically in FIGS. 5-8, they are shown more realistically in FIGS. 17-23.

Referring now to FIGS. 9-12, attention is directed to the way in which overall system 10 ensures that a given disc assembly is properly moved between a storage shelf or drive assembly and carriage 58. At this point, it should be recalled that the vertical corridors defined by light beams 4 (FIG. 2) are normally clear if there are no unintended obstructions and so long as a disc assembly is not being moved between a shelf and the carriage. When a disc assembly is moved between a shelf and the carriage, system 10 is designed to operate the carriage assembly so that this is supposed to take a specific amount of time known by the computer. FIG. 9 diagrammatically illustrates in exaggerated manner the point in time when cooperating hook members 112 are in their actuated positions ready to pull the cooperating disc assembly from its shelf onto the carriage. For purposes of clarity, the bumper members have not been shown but they would be in their actuated positions also. Moreover, it should be noted that at this very point in time, beam 4 is free to move between the disc assembly and carriage assembly, as shown in FIG. 9. However, as arm arrangement 62 moves horizontally to the right (as viewed in FIG. 9) pulling out the disc assembly, the latter starts to block beam 4, as shown in FIG. 10. Under normal intended conditions, this continues for a predetermined period of time which can be determined by the computer since the length of the disc assembly is fixed and since the speed of its movement is known. Thus, so long as the beam 4 is blocked only for that period of time, the computer will know that the disc assembly has been successfully moved onto the carriage. This is also true where the disc assembly is moved off of the carriage and into a shelf (or drive assembly). In this regard, it should be recalled that the disc assembly moves into and out of a storage shelf at a different speed than it moves between a drive assembly and entry/exit shelf. Computer 26 can compensate for this difference.

There are two distinct problems that may occur as a disc assembly is moved between its shelf and the carriage assembly. First, the cartridge housing and the disc (including its frame) may partially separate from one another, as illustrated in FIG. 11. If this occurs, the length of the overall disc assembly as it moves between the shelf and carriage assembly is longer than it should be. Thus, the light beam 4 is blocked for a longer period of time which alerts the computer to this situation. The second possibility is that only the cartridge housing is pulled off the shelf (or out of the drive assembly), leaving the disc and frame in place. Under this circumstance, only the cartridge housing blocks beam 4 which means that the beam is blocked for a shorter period of time than expected. Thus, the computer is alerted to this situation.

In the actual operation of overall system 10, if either of the unintended situations described immediately above occurs, the computer commands the carriage assembly to attempt to retrieve the disc itself (in the second case) or commands it to move back into and out of its disc assembly engaging position (in the first case) in hopes of bringing the disc and its cartridge housing back together. It will attempt to do this at least once or several times in a preferred operating embodiment. However, as it does so, the computer will order the drive motor for moving the particular cross arm in question at a slower speed each and preferably the motor will be driven in a torque mode rather than an acceleration mode. In this way, should it be even slightly difficult to correct the situation, the motors will shut down so as prevent the carriage assembly from inadvertently damaging the disc assembly. Since the technique of utilizing an electric motor in both its acceleration and torque mode is not per se new, the description of how this is accomplished will not be provided herein. The present invention resides in the utilization by system 10 of this technique for protecting its equipment, not in the technique itself.

Turning now to FIG. 13, attention is directed to the way in which overall carriage assembly 56 is moved vertically through transport support structure 48. For purposes of this description, the carriage assembly has been shown in FIG. 13 only diagrammatically as a plate member. As indicated previously, the carriage assembly is moved vertically by means of drive arrangement 60 including electric drive motor 82. As shown in FIG. 13, drive arrangement 60 includes a pair of endless drive belts 120 connected at their upper ends to ends of a freewheeling shaft (not shown) and at their bottom ends to a drive shaft 122 which is shown in FIG. 13. The drive motor 82 is coupled to drive shaft 122 through a belt assembly 124 for driving the shaft in one direction or the other. The carriage assembly 56 is connected to aligned horizontal points on one side of each drive belt 120 by suitable fastening lugs generally indicated at 126. At the same time, support structure 48 includes guides 127 (see FIG. 17) cooperating with the carriage assembly to ensure that the assembly remains horizontally aligned. As the drive belts 120 are driven by motor 82, this causes the connecting lugs 126 to move vertically, thereby pulling the carriage assembly with it. The fact that the carriage assembly is supported at two horizontally aligned points as it moves vertically, helps ensure that the carriage assembly remains horizontally aligned during its movement.

As a safety feature in the overall operation of system 10, any time that an arm arrangement 62 or 64 is actually delivering or picking up a disc assembly in the manner described above, an electrically operated brake 128 (which i in its braking mode when not electrically energized) forming part of drive arrangement 60 is de-energized for braking drive shaft 122 in order to ensure that the drive belts are not inadvertently moved during those times. To further ensure the drive belts do not move, will disconnect the power to the motor as well as the brake which, as stated above, causes the brake to engage. In addition, suitable switch means are provided for automatically shunting motor 82 in order to lock its drive shaft. Thus, there are several features which ensure that the carriage assembly does not move vertically as it is picking up and delivering a disc assembly. Moreover, so as not to place a large load on brake 128, the side of each endless belt includes a counterweight 129.

As indicated previously, carriage assembly 56 is capable of flipping each disc assembly or assemblies supported on its carriage in order to rotate them 180°. FIGS. 14 and 15 illustrate this. In both figures, the section of carriage 58 is shown diagrammatically at 130. That section is shown supporting a single disc assembly 12, although the overall carriage assembly is capable of supporting two such assemblies. Note from FIGS. 14 and 15 that carriage section 130 is supported by the previously recited center shaft 74 for rotation about the axis of the latter in the manner described previously in conjunction with FIG. 2. In order to ensure that the disc assembly remains properly supported to the carriage section, the carriage includes spring-biased bearings 132 which engage in cooperating detents 134 in the sides of cartridge housing 16 (or corresponding detents 134' in housing 16') (see FIGS. 1C and 1D). Two such arrangements are shown in FIG. 15. While this may suffice, it is possible to include additional such arrangements to ensure that the disc assembly remains in place. At the same time, the disc assembly must be readily removable from the carriage by means of cooperating arm arrangement 62 or 64 in the manner described above.

With the exception of certain details to be described hereinafter, the foregoing has been the description of overall system 10 including both a drive and disc storage unit 20 and a driveless disc storage unit 22 along with a storage disc transport unit 24. As indicated previously, the overall system could include only the units 20 and 24 without the driveless disc storage unit 22. Under such circumstances, unit 24 would operate in the same manner described above. However, it would only act to transport disc assemblies on one side of its support structure. On the other hand, the system could be expanded to include more units 20 and more units 22 sharing a common transport unit 24. This is illustrated in FIG. 16 which shows two transport units 24 on cooperating track assemblies 140 for movement along straight lines paths. On either side of the path of each unit 24 are a series of units 20 and 22 in the same relationship illustrated in FIG. 1B. In the expanded system illustrated in FIG. 16, a given unit 24 can be controlled by its control computer from instructions by a host computer to move between units 20 and 22 and thereby provide substantial expansion without requiring additional units 24. To this end each unit 24 would include its own internal or external drive arrangement for moving it along a cooperating track 140.

Turning now specifically to FIGS. 17-23, a number of details of the overall carriage assembly 56 will be described. In this regard, it is to be understood that these latter figures illustrate an actual working embodiment of the carriage assembly with various components missing for purposes of clarity. Also, it is to be understood that the actual components illustrated in FIGS. 17-23 and the corresponding components diagrammatically illustrated in the earlier figures are designated by the same reference numerals.

Turning specifically to FIG. 17, both of the arm arrangements 62 and 64 are illustrated including their respective cross arms. The cross arms are shown mounted to opposite sides of carriage 58. Their respective hook members 112 and bumper members 114 on corresponding sides of the cross arms are shown in their raised, unactuated positions. FIG. 18 specifically illustrates the carriage segment 130 and shaft 74 about which it rotates to flip a disc assembly 12. FIG. 17 on the other hand illustrates a carriage assembly to accomplish this. Specifically, FIG. 17 illustrates a drive motor 160 connected through gears 162 to an endless chain 164 supported by cooperating sprockets including one mounted to shaft 74 (shown in FIG. 18). The drive motor, upon receiving commands from computer 26, drives the chain in one direction or the other to rotate carriage section 130 in the desired manner.

Still referring to FIGS. 17 and 18 in particular conjunction with FIGS. 19-22, arrangements 66 and 68 for driving arm arrangements 62 and 64 are illustrated in detail. As indicated previously, the drive arrangement 66 includes a drive motor 84 and the drive arrangement 68 includes a drive motor 86. The drive motor 84 is connected to and drives an endless drive chain 170 while the drive motor 86 is connected to and drives an endless drive chain 172. These drive chains are connected to the respective cross arms of arm arrangements 62 and 64 in the same manner as belt 120 is connected to the overall carriage itself, that is, by a connecting lug (not shown) on one side of each chain. In that way, as each chain 170 and 172 is driven horizontally in one direction or the opposite direction, it moves its associated cross arm with it. It does so in either an acceleration mode or a torque mode, depending upon the commands by computer 26 under the circumstances discussed previously. Also, as stated previously, each of the drive motors 84 and 86, like carriage motor 82 includes its own encoder and a servo-feedback circuit for monitoring the position of its cross arm in the manner described.

Directing attention to FIG. 23 in conjunction with FIGS. 19-22, note the way in which a given pair of hook members 112 and a pair of bumper members 114 are moved between their respective actuated and deactuated positions. To this end,. one of the cross arms, for example, cross arm 96, is illustrated apart from the rest of its arm arrangement. Cross arm 96 is shown with its hook members and bumper members in their deactuated positions. Each of the hook members on one side of the cross arm, for example the side shown in FIG. 23, are actuated by an electrically actuated solenoid 180 which is connected to both of the members through a linkage arrangement shown at least in part in FIGS. 19-23. A second solenoid 182 operates the hook members (not shown) on the opposite side of cross arm 96 through a similar cooperating linkage arrangement. A third solenoid 184 is connected through a similar linkage arrangement to the bumpers 114 shown in FIG. 23 and bumpers on the other side of the cross arm (not shown) so that all four bumpers on the cross arm are simultaneously actuated and deactuated together.

Turning to FIGS. 24A and 24B, attention is directed to a specific detail in the linkage system between the solenoid 180 or 182 and its associated hook members 112. In particular, FIGS. 24A and 24B show solenoid 180 and one of the hook members 112. Note that the hook member is connected to the output of solenoid 180 through a series of three links 183, 184 and 186 which are pivotally connected to one another. FIG. 24A illustrates how these links are positioned when the solenoid places the hook member in its deactuated position and FIG. 24B shows how these links are positioned when the solenoid places the hook member in an actuated position. Note that the two links 183 and 184 are bent relative to one another in the FIG. 24A position while they are relatively straight in the FIG. 24B. In this latter figure, the two links 183 and 184 form a knee lock which is difficult to break without use of the solenoid itself. In this way, the knee lock serves as a means of locking the hook member 112 in an actuated position without requiring a large force from the solenoid itself. Once the solenoid breaks this knee lock, it can readily move to its deactuated position. A similar linking arrangement is provided for each of the other hook members.

Overall system 10 has now been described including various specific features. Among those features which have been specifically described are ones that are considered important to the present invention while other features which have been described are those important to understanding the overall environment of the invention. Some features of the overall system have been illustrated in the drawings but not necessarily described and there are some readily providable features which have not been described or shown at all. Those features which have been illustrated but not described and those features which have not been either illustrated or described could be readily provided by those with ordinary skill in the art in view of the disclosure herein. Moreover, it is to be understood that the present invention is not directed to the actual computer software forming part of computer 26. It suffices to say again that an individual with ordinary skill in the art could readily provide the software required for computer 26 to operate the system along with the cooperating hardware including the appropriate communication links between the system, computer 26 and a host computer. Further, while the present invention has been described with respect to information storage discs, it is in most instances equally applicable to other types of information storage media such as tapes. Moreover, the transport unit could be used to transport other objects between various points in its system.

What is claimed is:

1. An information handling system especially suitable for use with information containing storage discs or other such information storage media, said system comprising:
   (a) a plurality of first spaced-apart drive units, each of which includes its own drive support structure having its own vertically extending coupling side and supporting a drive assembly having means for writing information onto or retrieving information from a particular one of said storage disc pursuant to commands from an external source when the particular disc is in an operating position defined by the assembly, said drive units being positioned relative to one another so that their respective coupling side faces the same direction;
   (b) an equal plurality of spaced-apart disc storage units respectively positioned in confronting relationship with cooperating ones of said drive units, each disc storage unit including a disc support structure having its own vertically extending coupling side and supporting a plurality of storage shelves for individually storing specific ones of said storage discs; said disc storage units being positioned in confronting relationship with said drive units so that a coupling side of each disc storage unit confronts a coupling side of a cooperating drive unit;
   (c) at least one storage disc transport unit including means for transporting storage discs between the storage shelves and drive assembly of any pair of confronting drive and storage units through the transport unit when the transport unit is in a specific physically unconnected operating position between that pair of drive storage units; and
   (d) means for moving said transport unit between different specific operating positions between the various pairs of confronting drive and storage units.

2. The system according to claim 1 wherein each of said drive units also includes its own plurality of storage shelves corresponding in function to the previously recited storage shelves.

3. A system according to claim 1 wherein said transporting means includes a carriage assembly including a carriage and means for moving said carriage vertically within said transport support structure, said carriage moving means including an arrangement of vertically extending drive belts supporting opposite sides of said carriage for its vertical movement, motor means for moving said belts, a coupling shaft connecting said motor means to said drive belts, and means associated with said coupling shaft for preventing said carriage form moving vertically as a disc is moved into or out of one of said shelves on said drive assembly.

4. A system according to claim 3 wherein said means for preventing said carriage from moving vertically as a disc is a moved into and out of one of said shelves or said drive assembly includes means for applying a brake to said shaft.

5. A system according to claim 4 wherein said preventing means includes means responsive to the movement of a disc for de-energizing and shunting said motor means.

6. An expandable information handling system for use with information containing storage discs, tapes or other such media, said system comprising:
   (a) a first, drive and disc storage unit including
      (i) a ertically extending drive/disc support structure having a plurality of vertically extending sides including a specific system coupling side,
      (ii) a drive assembly having means for writing information onto or retrieving information from a particular one of said storage discs pursuant to commands from an external source when the particular disc is in an operating position defined by the assembly, said drive assembly being supported by said drive/disc support structure at a particular point along its vertical extent such that the operating position of the assembly is accessible from the coupling side of the support structure, (iii) a plurality of storage shelves for individually storing specific ones of said storage discs, said shelves being supported by said drive/disc support structure in vertically spaced positions above and/or below said drive assembly so as to be accessible from the coupling side of said structure;

(b) a second, disc storage unit separate from said drive and disc storage unit and including (i) a vertically extending disc support structure having a plurality of vertically extending sides including a specific system coupling side, and (ii) a plurality of storage shelves for individually storing specific ones of said storage discs, said shelves being supported by said disc support structure in vertically spaced positions so as to be accessible from the coupling side of the disc support structure; and (c) a third, storage disc transport unit including (i) a vertically extending transport support structure having a plurality of vertically extending sides including specific first and second system coupling sides which are removably positionable in operating positions adjacent to and facing the coupling sides of said drive/disc support structure and said disc support structure, respectively, and (ii) means cooperating with said transport support structure for transporting specific ones of said storage discs between any of said storage shelves and said drive assembly pursuant to commands from said external source, said transporting means including a carriage assembly including (1) a carriage, (2) at least one disc engaging arm carried by and movable horizontally with respect to said carriage in order to move discs into and out of said shelves and drive assembly, (3) means for moving said carriage vertically within said transport structure, and (4) means for preventing said carriage from moving vertically as a disc is moved into or out of one of said shelves or said drive assembly, said carriage moving means including an arrangement of vertically extending drive belts supporting opposite sides of said carriage for its vertical movement and means for moving the drive belts in response to external commands, said drive belt moving means including motor means and a coupling shaft connecting said motor means to said drive belts, said means for preventing said carriage from moving vertically as a disc is moved into and out of one of said shelves or said drive assembly includings means for applying a brake to said shaft, and means responsive to the movement of a disc for de-energizing and shunting said motor means.

7. A system according to claim 6 wherein each of said disc storage units includes a motorized entry/exit arrangement for placing a specific storage disc into and removing it from the overall system, said arrangement including an entry/exit storage shelf supported by said disc support structure in vertical alignment with said drive assembly of said drive units and accessible from both the coupling side of the disc storage structure and a different external one of its vertically extending sides, said entry/exit storage shelf being configured for motorized cooperation with said storage disc transport unit in the same way as the other shelves supported by said disc support structure.

8. A system according to claim 7 wherein said entry/exit arrangement includes a tray, arranged within said entry/exit shelf, movable between a pickup position accessible from an external side of said disc storage structure and a storage position accessible from said coupling side of said disc storage structure, and a drive motor assembly disposed within said disc storage structure for moving said tray between said pickup and said storage positions.

9. A system according to claim 8 wherein said entry/exit arrangement includes means for facilitating placement of said disc assembly within said entry/exit shelf in a predetermined orientation.

10. A system according to claim 9 wherein said facilitation means includes a spring loaded arm mounted within said entry/exit shelf for movement between a biased blocking position prohibiting placement of said disc assembly within said shelf and a retracted position permitting placement of said disc assembly within said shelf, said arm having a detent means for engaging said disc assembly placed in said shelf in anything other than said predetermined orientation and maintaining said arm in said biased blocking position.

11. An information handling system especially suitable for use with information containing storage discs or other such information storage media, said system comprising:

(a) a plurality of spaced-apart drive units, each of which includes its own drive support structure for supporting a drive assembly having means for writing information onto or retrieving information from a particular one of said storage discs pursuant to commands from an external source when the particular disc is in an operating position defined by the assembly and each of which further includes its own plurality of storage shelves for individually storing specific ones of said storage discs;

(b) an equal plurality of spaced-apart disc storage units respectively positioned opposite cooperating ones of said drive units, each disc storage unit including the disc support structure for supporting a plurality of storage shelves corresponding in function to the previously recited storage shelves and further including a motorized entry/exit arranged for placing a specific storage disc into and removing it from the overall system, said arrangement including an entry/exit storage shelf supported by said disc support structure in vertical alignment with said drive assembly of said drive units and accessible from both the coupling side of the disc storage structure and a different external one of its vertically extending sides, said entry/exit storage shelf being configured for motorized cooperation with said storage disc transport unit in the same way as the other shelves supported by said disc support structure;

(c) at least one storage disc transport unit including means for transporting storage discs between the storage shelves and drive assembly of any pair of drive and storage units when the transport unit is in a specific physically unconnected operating position between that pair of drive and storage units; and (d) means for moving said transport unit between different specific operating positions between the various pairs of drive and disc storage units.

12. A system according to claim 11 wherein said entry/exit arrangement includes a tray, arranged within said entry/exit shelf, movable between a pickup position accessible from an external side of said disc storage structure and a storage position accessible from said coupling side of said disc storage structure, and a drive motor assembly disposed within said disc storage structure for moving said tray between said pickup and said storage positions.

13. A system according to claim 12 wherein said entry/exit arrangement includes means for facilitating placement of said disc assembly within said entry/exit shelf in a predetermined orientation.

14. A system according to claim 13 wherein said facilitation means includes a spring loaded arm mounted within said entry/exit shelf for movement between a biased blocking position prohibiting placement of said disc assembly within said shelf and a retracted position permitting placement of said disc assembly within said shelf, said arm having a detent means for engaging said disc assembly placed in said shelf in anything other than said predetermined orientation and maintaining said arm in said biased blocking position.

15. A storage transport unit for use as part of an expandable information handling system also including disc storage and disc drive units for use with information containing storage discs, tapes or other such media, said storage transport unit comprising:
   (a) a vertically extending transport support structure having a plurality of vertically extending sides including specific first and second system coupling sides which are removably positionable in operating positions adjacent to and facing said disc drive and disc storage units; and
   (b) means cooperating with said transport support structure for transporting specific ones of said storage disc between the transport unit and either said disc drive or disc storage unit pursuant to commands from said external source, said transporting means including a carriage assembly including (1) a carriage, (2) at least one disc engaging arm carried by and movable horizontally with respect to said carriage in order to move discs into and out of said disc drive or disc storage unit, (3) for moving said carriage vertically within said transport structure, and (4) means for preventing said carriage from moving vertically as a disc is moved into or out of said disc drive or disc storage unit, said carriage moving means including an arrangement of vertically extending drive belts supporting opposite means for moving the drive belts in response to external commands, said drive belt moving means including motor means and a coupling shaft connecting said motor means to said drive belts, said means for preventing said carriage from moving vertically as a disc is moved into and out of said disc drive or disc storage unit including means for applying a brake to said shaft, and means responsive to said movement of a disc for de-energizing and shunting said motor means.

* * * * *